US008571298B2

(12) United States Patent
McQueen et al.

(10) Patent No.: US 8,571,298 B2
(45) Date of Patent: Oct. 29, 2013

(54) METHOD AND APPARATUS FOR IDENTIFYING AND TALLYING OBJECTS

(75) Inventors: Alexander M. McQueen, Eugene, OR (US); Craig D. Cherry, Eugene, OR (US)

(73) Assignee: DATALOGIC ADC, Inc., Eugene, OR (US)

( * ) Notice: Subject to any disclaimer, the term of this patent is extended or adjusted under 35 U.S.C. 154(b) by 846 days.

(21) Appl. No.: 12/636,515

(22) Filed: Dec. 11, 2009

(65) Prior Publication Data

US 2010/0158310 A1 Jun. 24, 2010

Related U.S. Application Data

(60) Provisional application No. 61/140,505, filed on Dec. 23, 2008.

(51) Int. Cl.
*G06K 9/00* (2006.01)

(52) U.S. Cl.
USPC ...... 382/143; 235/378; 235/462.11; 382/156; 382/181

(58) Field of Classification Search
USPC ............. 235/375, 383, 462.01; 382/143, 156, 382/181
See application file for complete search history.

(56) References Cited

U.S. PATENT DOCUMENTS

| | | | |
|---|---|---|---|
| 4,939,355 A | 7/1990 | Rando et al. | |
| 5,426,282 A | 6/1995 | Humble | |
| 5,497,314 A | 3/1996 | Novak | |
| 5,543,607 A | 8/1996 | Watanabe et al. | |
| 5,609,223 A | 3/1997 | Iizaka et al. | |
| 5,679,941 A | 10/1997 | Iizaka et al. | |
| 5,804,807 A | 9/1998 | Murrah et al. | |
| 5,920,056 A | 7/1999 | Bonnet | |
| 5,984,182 A | 11/1999 | Murrah et al. | |
| 6,061,091 A | 5/2000 | Van de Poel et al. | |
| 6,213,397 B1 | 4/2001 | Rando | |

(Continued)

FOREIGN PATENT DOCUMENTS

| | | |
|---|---|---|
| EP | 0325469 | 7/1989 |
| KR | 2000-0024206 | 5/2000 |
| KR | 2002-0095586 | 12/2002 |

OTHER PUBLICATIONS

Rekimoto and Ayatsuka, "Cybercode: Designing Augmented Reality Environments with Visual Tags," Sony Computer Science Laboratories, Inc., Feb. 18, 2000.

(Continued)

*Primary Examiner* — Gregory M Desire
(74) *Attorney, Agent, or Firm* — Stoel Rives LLP

(57) ABSTRACT

An system and method for tallying objects presented for purchase preferably images the objects with a machine vision system while the objects are still, or substantially still. Images of the objects may be used to recognize the objects and to collect information about each object, such as the price. A pre-tally list may be generated and displayed to a customer showing the customer the cost of the recognized objects. A prompt on a customer display may be given to urge a customer to re-orient unrecognized objects to assist the machine vision system with recognizing such unrecognized objects. A tallying event, such as removing a recognized object from the machine vision system's field of view, preferably automatically tallies recognized objects so it is not necessary for a cashier to scan or otherwise input object information into a point of sale system.

40 Claims, 10 Drawing Sheets

(56) References Cited

U.S. PATENT DOCUMENTS

| | | |
|---|---|---|
| 6,347,740 B1 | 2/2002 | Bengala |
| 6,592,033 B2 | 7/2003 | Jennings et al. |
| 6,808,114 B1 | 10/2004 | Palestini et al. |
| 7,118,026 B2 | 10/2006 | Harris et al. |
| 7,246,745 B2 * | 7/2007 | Hudnut et al. ............... 235/383 |
| 7,337,960 B2 * | 3/2008 | Ostrowski et al. ............ 235/383 |
| 7,646,887 B2 | 1/2010 | Goncalves et al. |
| 7,841,524 B2 * | 11/2010 | Schmidt et al. ............... 235/383 |
| 7,909,248 B1 * | 3/2011 | Goncalves .................... 235/383 |
| 8,068,674 B2 | 11/2011 | Goncalves |
| 8,196,822 B2 | 6/2012 | Goncalves |
| 2005/0097064 A1 | 5/2005 | Werden |
| 2006/0038009 A1 | 2/2006 | Russell et al. |
| 2010/0059589 A1 | 3/2010 | Goncalves et al. |
| 2010/0076855 A1 * | 3/2010 | Karnin et al. ................... 705/24 |
| 2010/0158310 A1 * | 6/2010 | McQueen et al. ............ 382/100 |
| 2010/0217678 A1 * | 8/2010 | Goncalves ...................... 705/22 |

OTHER PUBLICATIONS

Rekimoto et al., "CyberCode: Designing Augmented Reality Environments with Visual Tags," Sony Computer Science Laboratories, Inc., Feb. 18, 2000.

Search Report and Written Opinion, PCT/US2009/068256, Aug. 6, 2010.

Matsumoto et al., "Quasi-Motion Extraction Utilizing Edge Field Analysis," Proceedings of the Eighth IASTED International Conference, *Signal and Image Processing*, pp. 28-33, Aug. 2006.

European Patent Office, Application No. EP09835617.3, corresponding to the present application: EP Office Action in dated Jun. 18, 2013 (reported by EP associate Aug. 5, 2013).

* cited by examiner

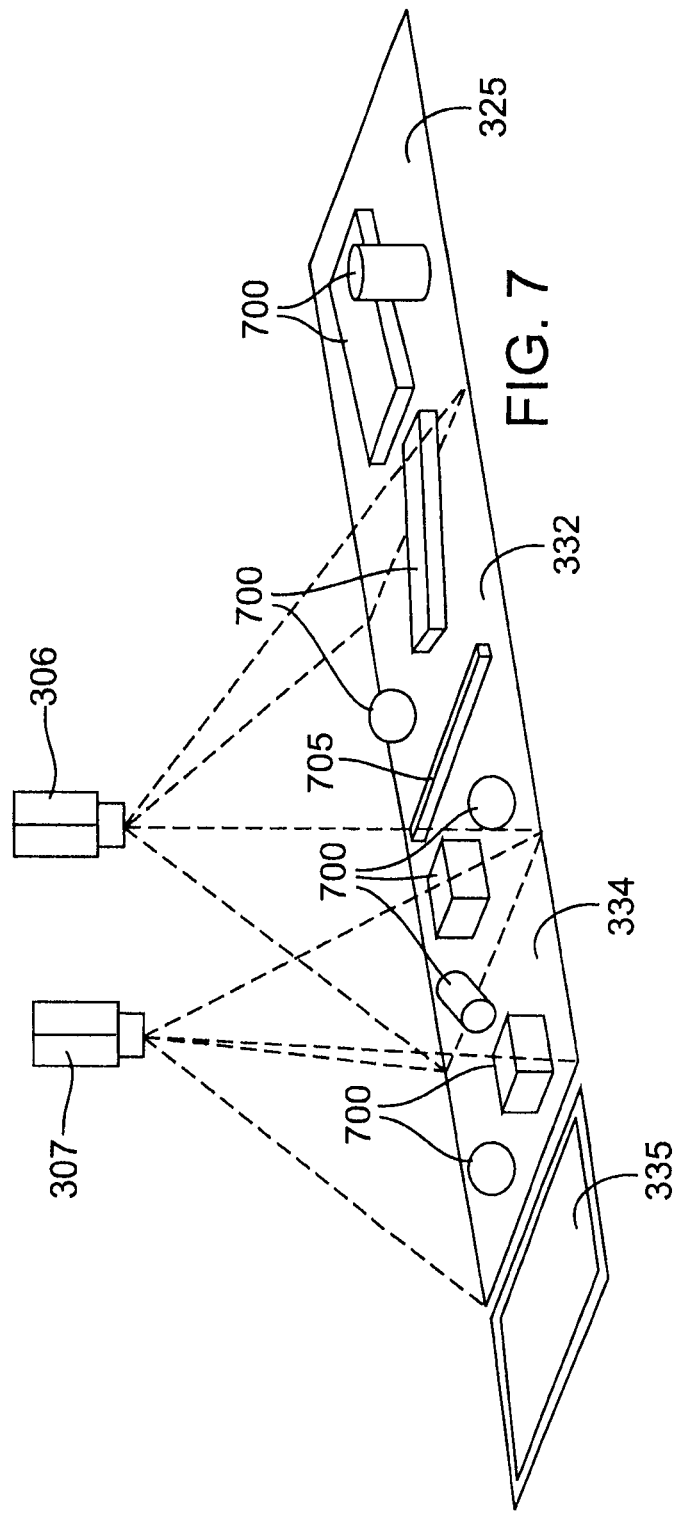

METHOD AND APPARATUS FOR IDENTIFYING AND TALLYING OBJECTS

RELATED APPLICATIONS

This application claims priority under 35 U.S.C. §119(e) to U.S. patent application Ser. No. 61/140,505 titled "Method and Apparatus for Identifying and Tallying Objects" filed on Dec. 23, 2008 and fully incorporated herein by reference.

BACKGROUND

The field of the present disclosure generally relates to processing items at a retail checkout or other point of handling station. In the retail checkout or point of sale (POS) location, for example, objects selected by a customer for purchase are currently transacted for checkout by a customer operating a scanner at a self-checkout station or by a cashier scanning the selected objects using an optical scanner to identify and read optical codes on the objects. The information from the optical codes is processed by a computer system to look up price information in a point of sale ("POS") system. A significant amount of time for current checkout processing results from the customer or the cashier grasping an object, orienting the object to present an optical code to a scanner, moving the object past the scanner's operative field, then bagging the object. The physical stress from moving objects past the scanner, which often requires rescanning, may increase the potential for repetitive motion injuries.

Various systems attempt to reduce object handling and the time it takes to transact items for purchase. U.S. Pat. Nos. 4,939,355; 5,497,314; 5,543,607; 5,609,223; 5,679,941; and 6,213,397 are directed to checkout systems that use a tunnel containing various items such as a height measuring apparatus, a camera, and/or a scanner. Items are sent through the tunnels of the various systems, and are processed one-by-one as the items pass through the tunnels. Item-by-item processing is not particularly fast or efficient, and the physical size of the tunnels limits what objects may be processed.

Other systems, such as described in U.S. Pat. No. 7,246,745, rely on machine or human recognition of objects. The system in U.S. Pat. No. 7,246,745 uses visual sensors to capture images of products, recognizes the products by analyzing the images with techniques such as the scale invariant feature transformation method, assesses the reliability of the recognition, and performs an action such as adding a product to a list if the reliability of the recognition exceeds a predetermined threshold. However, if the system does not recognize an item, the system requests the operator to identify the object and to provide information regarding the object using an input device, such as a scanner.

The present inventors have recognized disadvantages with existing systems for transacting items presented for purchase. Such disadvantages may include relatively large time requirements for grasping, orienting, and scanning items; potential for fatigue and injury to cashiers; tunnels that limit what objects can be processed; using complex and expensive equipment; incompatibility with existing checkout systems; reliance on machine or human identification of products instead of using human assisted machine identifications; and relatively inflexible use that does not readily permit a customer to remove an object once a machine system processes the object.

SUMMARY

Preferred embodiments include a machine vision system for recognizing objects placed on a belt or counter prior to the objects reaching a checkout or other handling station. The machine vision system preferably communicates with a processing system, for example, but not limited to, a POS system, a package routing system, a production line management system, or other suitable system. Objects recognized by the machine vision system may be included on a pre-checkout list, or other suitable list, viewable by a customer or operator. A display communicating with the machine vision system may be used to prompt the customer or operator to reposition objects that the machine vision system does not recognize in an effort to assist the machine vision system in recognizing such unrecognized objects. When the objects are presented to a customer or operator, the customer or operator is preferably notified which objects are recognized by the machine vision system, for example, by lights or a display. When the customer or operator removes recognized objects from the belt or counter, such objects are preferably automatically processed by the processing system.

An exemplary system includes a machine vision system operatively connected to an existing customer or operator station, which is connected to a processing system. In a preferred configuration, the machine vision system captures images of products, or other objects, after a customer or operator places the products on a counter or conveyor belt, preferably in a pre-transaction zone viewable by the machine vision system. The machine vision system seeks and reads optical codes on the objects to recognize the objects, for example, by performing a lookup in a database using information read from the optical codes. Item imaging preferably occurs when a customer or operator places items on the counter or belt, and before the processing transaction starts, in other words, when the items are substantially stationary.

For items that are not recognized, the system may show a prompt on a display screen to re-orient unrecognized products so an optical code faces a direction viewable by the machine vision system. Such re-oriented items are then recognized by the machine vision system, if possible. The system may provide a pre-transaction list of the recognized items for the customer or operator on the display screen, which may include a description of each item, the price of each item, a destination for each item, a running total of the cost of all recognized items, or other suitable information. A customer or operator may remove a recognized item from a pre-transaction zone, and preferably, if the removed item is not placed in a transaction zone, the system removes the recognized item from the pre-transaction list.

Recognized and unrecognized items are moved from the pre-transaction zone into a transaction zone viewable by the machine vision system. The system preferably indicates to the customer or operator which items in the transaction zone are recognized, thus informing the customer or operator that the recognized items do not need to be scanned. For example, a second display screen may face the customer or operator and include an image of the items in the transaction zone along with an indication regarding which items are recognized and/or which items are not recognized. When the customer or operator removes recognized items from the transaction zone, the system automatically processes the removed items, for example, by adding the removed recognized items to a list of routed items and updating the list to reflect each item and its destination. Unrecognized items may be added to the list of processed items when the customer or operator uses the existing customer or operator station in a presently known manner, for example, by removing an unrecognized item from the transaction zone and weighing the item and entering a product or item code into the customer or operator station, or by scanning the item with an optical code reader.

Embodiments may be adapted for use with existing processing systems, such as retail checkout systems. Certain embodiments provide a pre-transaction zone where a customer or operator may add and remove items to and from a pre-transaction list simply by adding and removing items to and from the pre-transaction zone. Preferably, processing for multiple items in the pre-transaction zone is performed in parallel, that is, not on a one-by-one basis. The system may include a prompting subsystem that prompts a customer or operator to re-orient unrecognized items, which enables users to assist the machine vision system with recognizing objects. Such human assistance may increase the accuracy and efficiency of a preferred system. Thus, embodiments may address some or all of the above identified disadvantages with existing processing systems, such as checkout systems, and/ or may address other needs or disadvantages.

Additional aspects and advantages will be apparent from the following detailed description of preferred embodiments, which proceeds with reference to the accompanying drawings.

BRIEF DESCRIPTION OF THE DRAWINGS

FIG. 7 is a schematic diagram of objects for two separate customer orders.

DETAILED DESCRIPTION OF PREFERRED EMBODIMENTS

Figure 1:
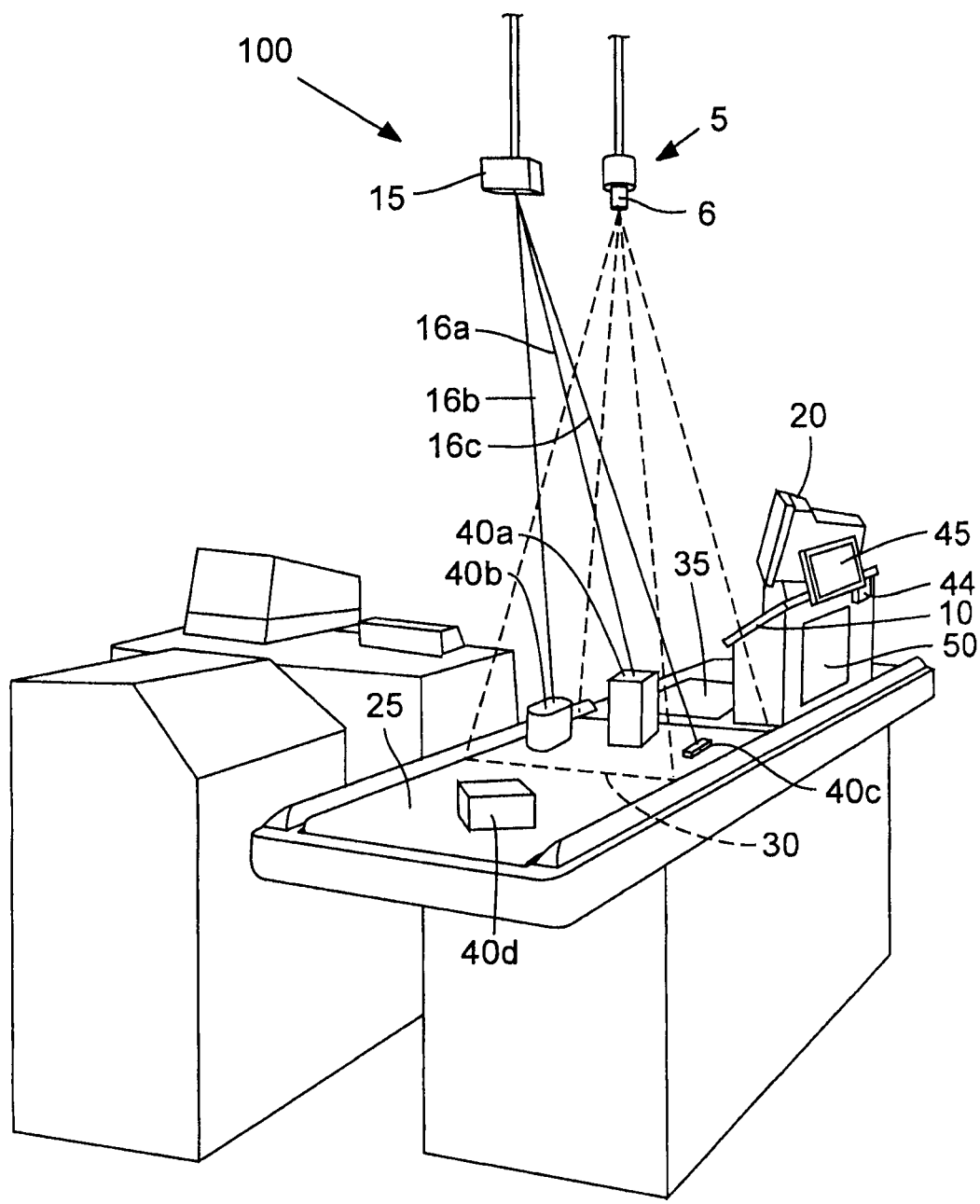
FIG. 1 is a schematic diagram of a preferred data reading system.

FIG. 1 illustrates a schematic diagram for a preferred data reading system 100 including a field of view 30 that defines a pre-transaction zone, which, in this example, is applied to a retail checkout counter. The data reading system 100 may be used at a checkout counter, as described below, or in other suitable applications, such as a self-checkout apparatus, package handling apparatus (such as used by the postal service, delivery and courier services, or airport baggage handling), or item routing apparatus used to route items during manufacturing processes, where it is useful for a machine to recognize objects and automatically tally or process the recognized objects upon a tallying event.

A computer 10 hosting or communicating with a POS system is operatively connected to an information gathering device 35. Computer 10 may include a cash register or any other suitable device having a digital processor, central processing unit, or other suitable computing element. The information gathering device 35 may be a barcode scanner utilizing optical means to capture data, such as lasers or imaging cameras. Alternately, information gathering device 35 may be a radio frequency reader or any other suitable device used to capture information. The information gathering device 35 may collect information in many manners. Therefore, references to scanning, reading, and gathering information should be understood to be inclusive of one another as well as inclusive of other manners for collecting information.

Information about each individual object 40a-40d may be collected from objects 40a-40d using the information gathering device 35 in a conventional manner (for example, via an optical code reader). However, as discussed below, information about each individual object 40a-40d is obtained and associated with each object 40a-40d preferably without using the information gathering device 35.

A moving belt 25 receives objects 40 from a customer and conveys the objects 40 towards the data gathering device 35. Alternately, the moving belt 25 may be replaced with a generally flat surface that does not move and the objects 40 may be pushed or otherwise moved towards the data gathering device 35.

A machine vision system 5 is positioned to have a field of view 30, where the field of view 30 is coincident with the belt 25, that is, the field of view 30 is located such that the machine vision system 5 can "see" and image objects on the belt 25. Machine vision system 5 is preferably a device or system of devices that digitally captures input, such as electromagnetic radiation, and digitally formats the input into a form a computer processes. For example, machine vision system 5 may include digital imagers, analog imagers operatively connected to a digitizer, optical readers, laser scanners, or other suitable devices that capture or interact with electromagnetic radiation to create digital information correlating to the electromagnetic radiation. Such digital information is formatted for computer processing using well established techniques, processes, and equipment.

In a preferred arrangement, machine vision system 5 includes one or more imagers, such as camera 6, and such imagers may be positioned at various distances and angles with respect to the field of view. In other words, multiple fields of view may overlap or intersect. In a preferred embodiment, the field of view 30 lies on and/or adjacent the belt 25. Alternatively, the machine vision system 5 may be located so the field of view 30 is orthogonal to the belt 25, or at any other suitable angle. In a preferred arrangement, machine vision system 5 includes imagers located remotely from the belt 25 thus permitting relatively easy access to objects 40 on belt 25, for example, as illustrated in FIGS. 1, 2, 3, and 3B. In alternate arrangements, imagers such as those disclosed in U.S. Provisional Patent Application No. 61/140,930 titled "Optical Code Reader Having Compact Arrangement for Acquisition of Multiple Views of an Object" filed on Dec. 26, 2008 and fully incorporated herein by reference may be used, even with the associated disadvantages related to tunnels as noted above.

In a preferred system or method, images of objects are captured while objects are stationary on a counter or conveyor belt. Thus, machine vision system 5 may include complimentary metal oxide semiconductor ("CMOS") imagers with rolling reset shutters. The machine vision system 5 preferably includes a camera 6 with a CMOS imager and a rolling reset shutter operatively connected with a processor, or computer system, and associated memory. Other suitable imagers may be used, such as, but not limited to, digital imagers including a CMOS imager with a global reset and a charged coupled device ("CCD") imager, and analog imagers operatively connected to a digitizer.

The machine vision system 5 is operatively connected to the computer 10, for example, via a physical transmission line or via wireless communication equipment and protocols. Software for processing images from the machine vision system 5 may reside in the machine vision system 5, on the computer 10, a combination of the two, and/or other computer systems. Processing images preferably includes searching for and decoding optical codes, such as universal product codes ("UPC"), on objects 40a-40d. An exemplary system and method for locating and processing optical codes is described in U.S. Pat. No. 6,808,114 titled "Apparatus and Method for Acquiring and Reading Optical Codes with Result Indication," hereby incorporated by reference. Other suitable image processing techniques for locating and/or decoding optical codes may be used. Alternatively, objects may be recognized through image analysis, such as by scale invariant feature transformation as described by David G. Lowe in "Object Recognition from Local Scale-Invariant Features," Proceedings of the International Conference on Computer Vision, Corfu, Greece, September, 1999 and in "Local Feature View Clustering for 3D Object Recognition," Proceedings of the Institute of Electrical and Electronics Engineers, Inc., Conference on Computer Vision and Pattern Recognition, Kauai, HI, December 2001; both of which are fully incorporated herein by reference. A combination of image analysis and optical code decoding may also be used to recognize objects by the machine vision system 5.

Recognizing objects 40 by processing images also preferably includes providing location data for each object 40a-40d. Location data is preferably used to track the position of each object 40a-40d as the objects 40 are moved, and is also used to determine motion characteristics for use in tallying the objects 40a-40d as described below. Objects 40a-40d may be mapped and tracked in the field of view 30, using image sequence analysis, blob analysis, optical flow analysis, block matching, a segmentation algorithm with or without spatiotemporal regions, a 2 dimensional or 3 dimensional transformation (such as an affine transformation or homography), mean-shift tracking, contour tracking, iterative gradient method under constrained optical flow, edge field analysis, or other suitable technique for identifying objects in an image and tracking the position of objects in an image. Motion characteristics may be determined using the above techniques, or by other suitable object motion tracking techniques. The trajectory and position of each object 40a-40d may be monitored, and the system may continually update its information on where all of the identified objects are within its imaging region.

An object identifier such as a light source 15 is operatively connected to the computer 10 for indicating to a customer whether the objects 40a-40d have been recognized by the data reading system 100. Light from the light source 15 is preferably projected onto the objects 40 by the computer 10 and/or the machine vision system 5 using the position and motion characteristics for each object 40a-40d. Light source 15 may include a laser, light emitting diode or other suitable light generator. The customer display may include a display screen 45, and/or the light source 15, or other suitable device for highlighting, marking, or otherwise making status information for an object 40a-40d known to a customer. A cashier display 20 is also operatively connected to the computer 10 for indicating the status of the objects 40a-40d to a cashier. The cashier display 20 is preferably similar to the customer display 15/45. Operation of the data reading system 100 is described below.

An alternate manner for indicating whether objects have been recognized by the data reading system 100 via a customer display and via a cashier display is to provide an indication proximate each object 40a-40d. For example, belt 25, or other suitable substantially flat surface, may be translucent or transparent. An array of lights, preferably including light emitting diodes, underlies belt 25. Activation of such array of lights is controlled by machine vision system 5 or computer 10 so that different color lights illuminate each object 40a-40d based on whether each object 40a-40d is recognized by the data reading system 100. In a preferred embodiment, a halo of light of a first color surrounds the base of each recognized object, and a halo of light of a second color surrounds the base of each unrecognized object. A customer may be prompted by the halo of light of the second color to reorient an object so that data reading system 100 may recognize the previously unrecognized object. Machine vision system 5 and/or computer 10 preferably coordinate activating the array of lights so the correct color halo "follows" each object as it moves along belt 25.

Figure 2:
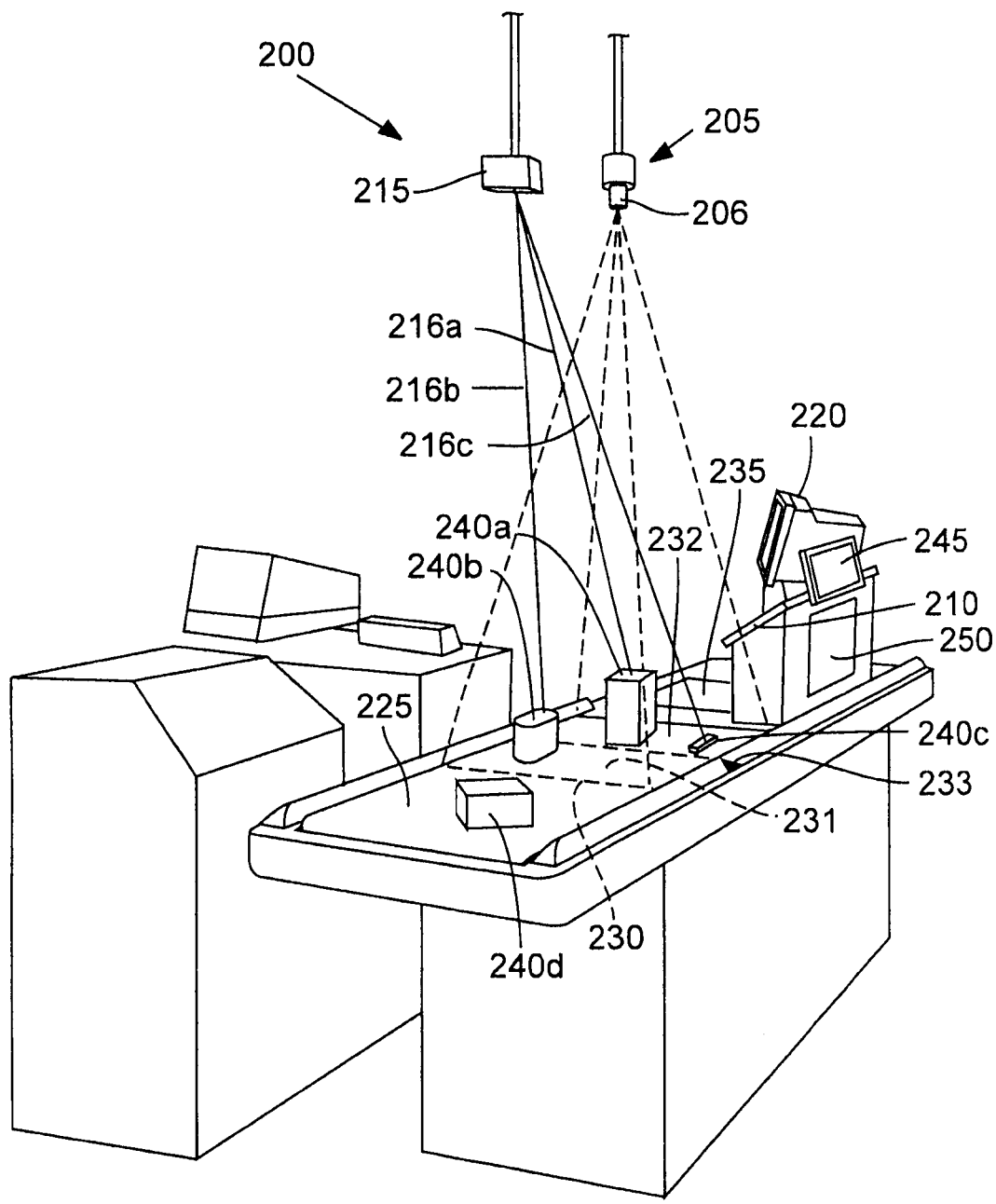
FIG. 2 is a schematic diagram of another preferred data reading system.

FIG. 2 illustrates a schematic diagram of another preferred data reading system 200 including a field of view 230. The components in the data reading system 200 are similar to the components in the data reading system 100, with the exception that the field of view 230 is preferably divided into a pre-transaction zone 231 and a transaction zone 232. A transaction zone 232 is preferably adjacent the pre-transaction zone and located downstream from the pre-transaction zone, that is, located between the pre-transaction zone and a POS or an information gathering device 235. The field of view 230 may be divided into a pre-transaction zone 231 and a transaction zone 232 in any suitable manner, for example, by designating a portion of the pixels of a CMOS imager in camera 206 as capturing the pre-transaction zone 231 and by designating the remaining pixels as capturing the transaction zone 232. Another exemplary manner is to include a marker 233 to indicate the boundary between the pre-transaction zone 231 and a transaction zone 232. Machine vision software uses the marker 233 to determine whether objects are in the pre-transaction zone 231 or in the transaction zone 232. Operation of a data reading system using a pre-transaction zone and a transaction zone is described below.

Figure 3:
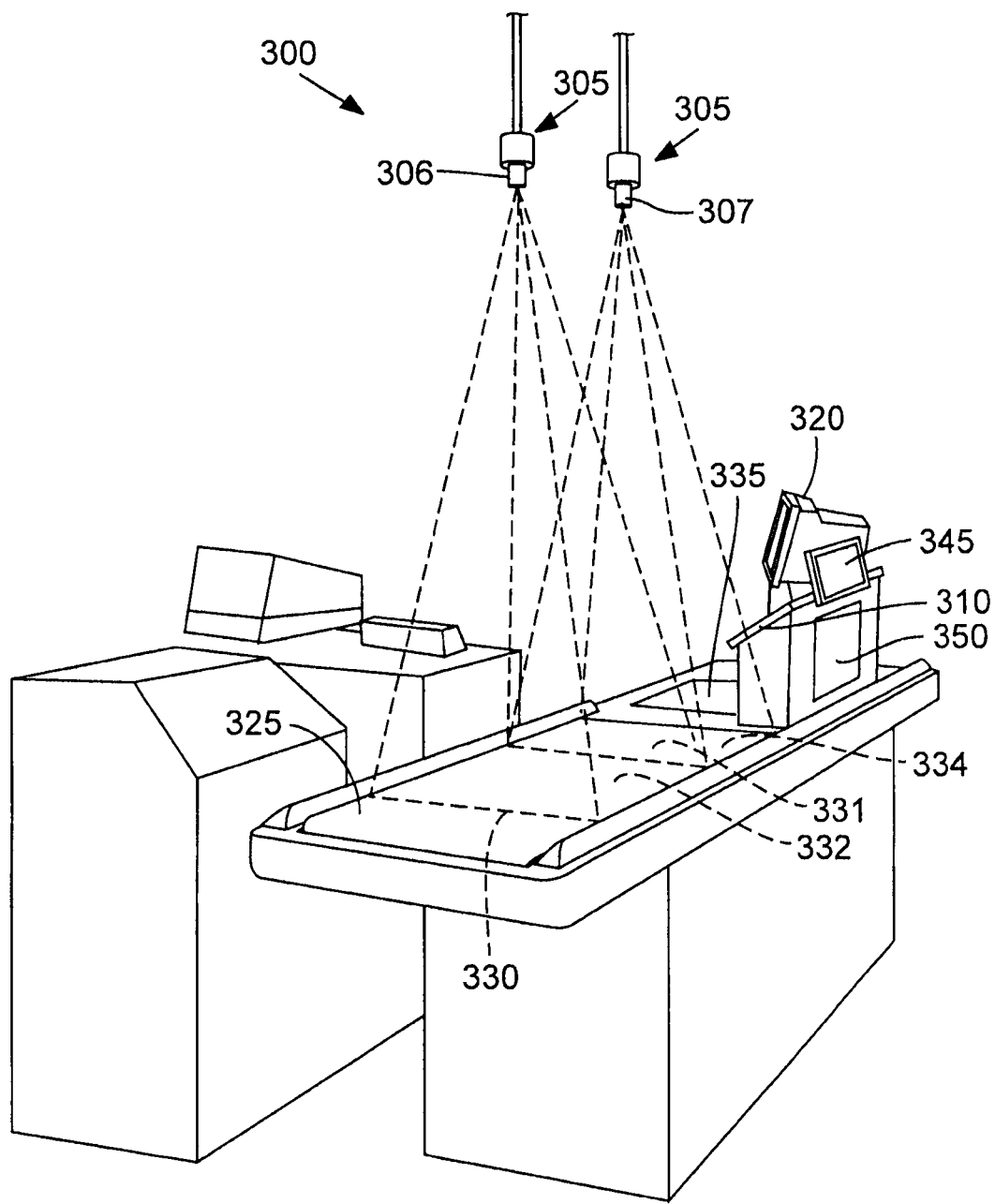
FIG. 3 is a schematic diagram of another preferred data reading system.

FIG. 3 illustrates a schematic diagram of another preferred data reading system 300 including a first field of view 330 and a second field of view 331. The machine vision system 305 preferably includes imagers 306 and 307, where the first field of view 330 corresponds to imager 306 and the second field of view 331 corresponds to imager 307. Preferably, the first field of view 330 defines a pre-transaction zone 332 and the second field of view 331 defines a transaction zone 334. Multiple cameras may be used to image each of the pre-transaction zone 332 and the transaction zone 334. In alternate embodiments, a barrier, which may be see-through and made from a material such as Plexiglas®, plastic, or glass, may be interposed between where a customer stands and the transaction zone 334. The purpose of such a barrier is to prevent a customer from removing items from the transaction zone 334.

Figure 3B:
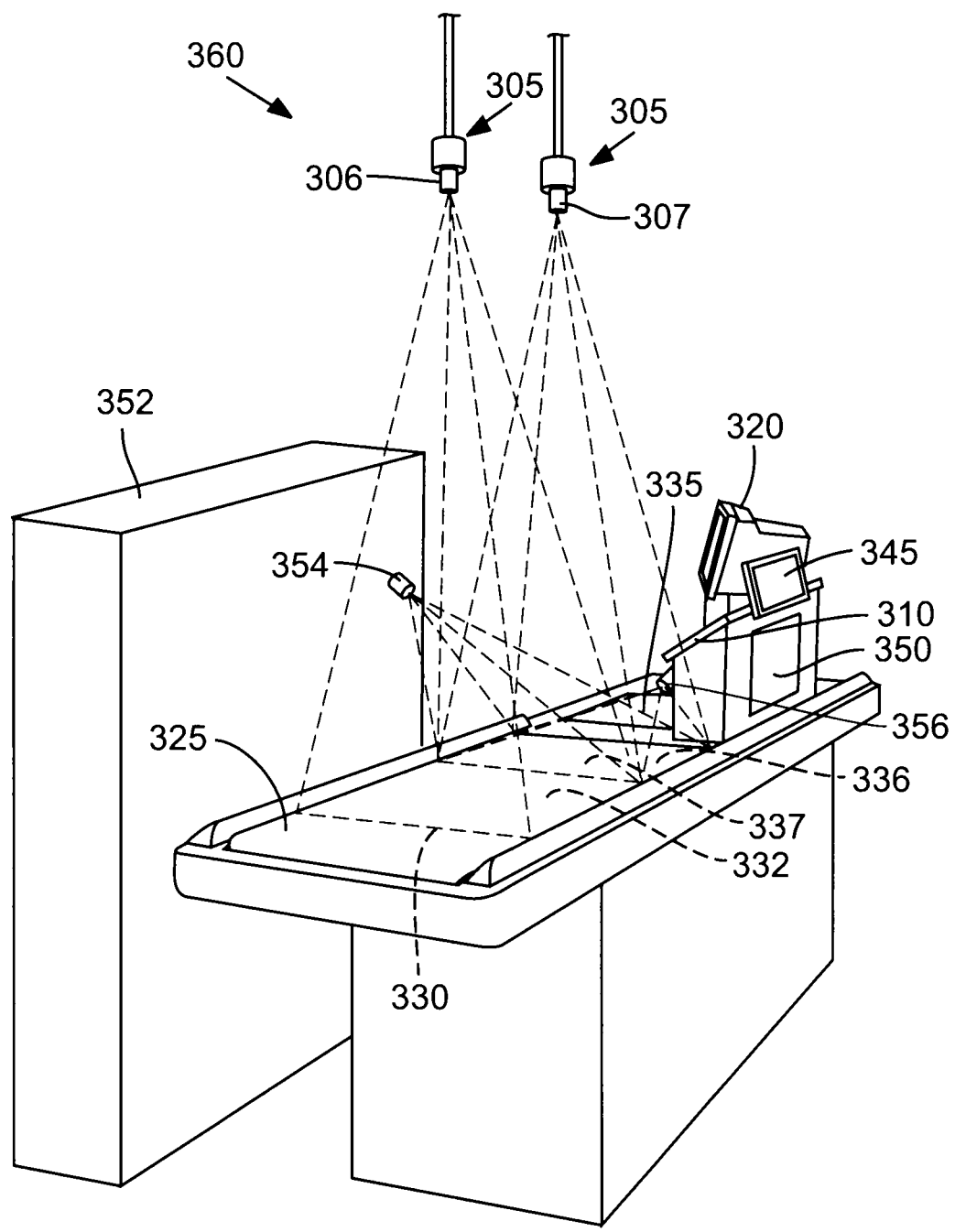
FIG. 3B is a schematic diagram of another preferred data reading system.

FIG. 3B illustrates a schematic diagram of another preferred data reading system 360. The same reference numerals are used to refer to elements common between FIG. 3 and FIG. 3B. Like the data reading system 300, the data reading system 360 may include a first field of view 330, a second field of view 331, and imagers 306 and 307. Preferably, the second field of view 331 extends to cover information gathering device 335 for purposes explained below. The data reading system 360 may or may not include a transaction zone 334 or a pre-transaction zone 332.

The data reading system 360 also includes an imager 354 mounted on a magazine rack 352, or on another suitable support. An imager 356 is preferably mounted opposing imager 354 on the opposite side of belt 325. Preferably, imagers 354 and 356 provide additional fields of view for capturing images or other data on the sides of objects on the belt 325 that may not be readily viewable by imagers 306 and 307.

Figure 5:
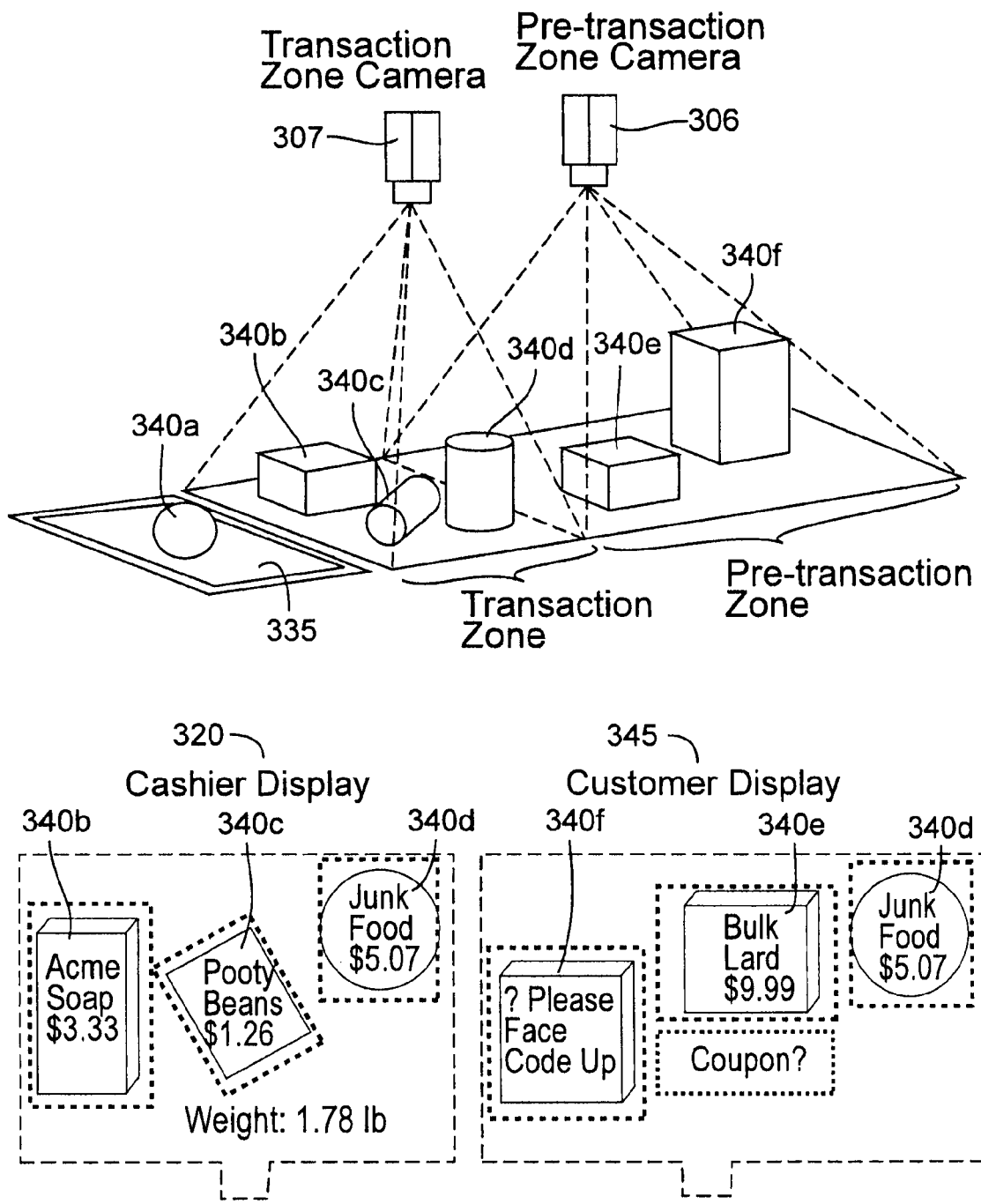
FIG. 5 is a schematic diagram of objects in a pre-transaction zone and of objects in a transaction zone.

As with other embodiments, the information gathering device 335 may include a scale, a data capture device, and other suitable equipment for gathering information from objects 340 (FIG. 5).

Figure 4:
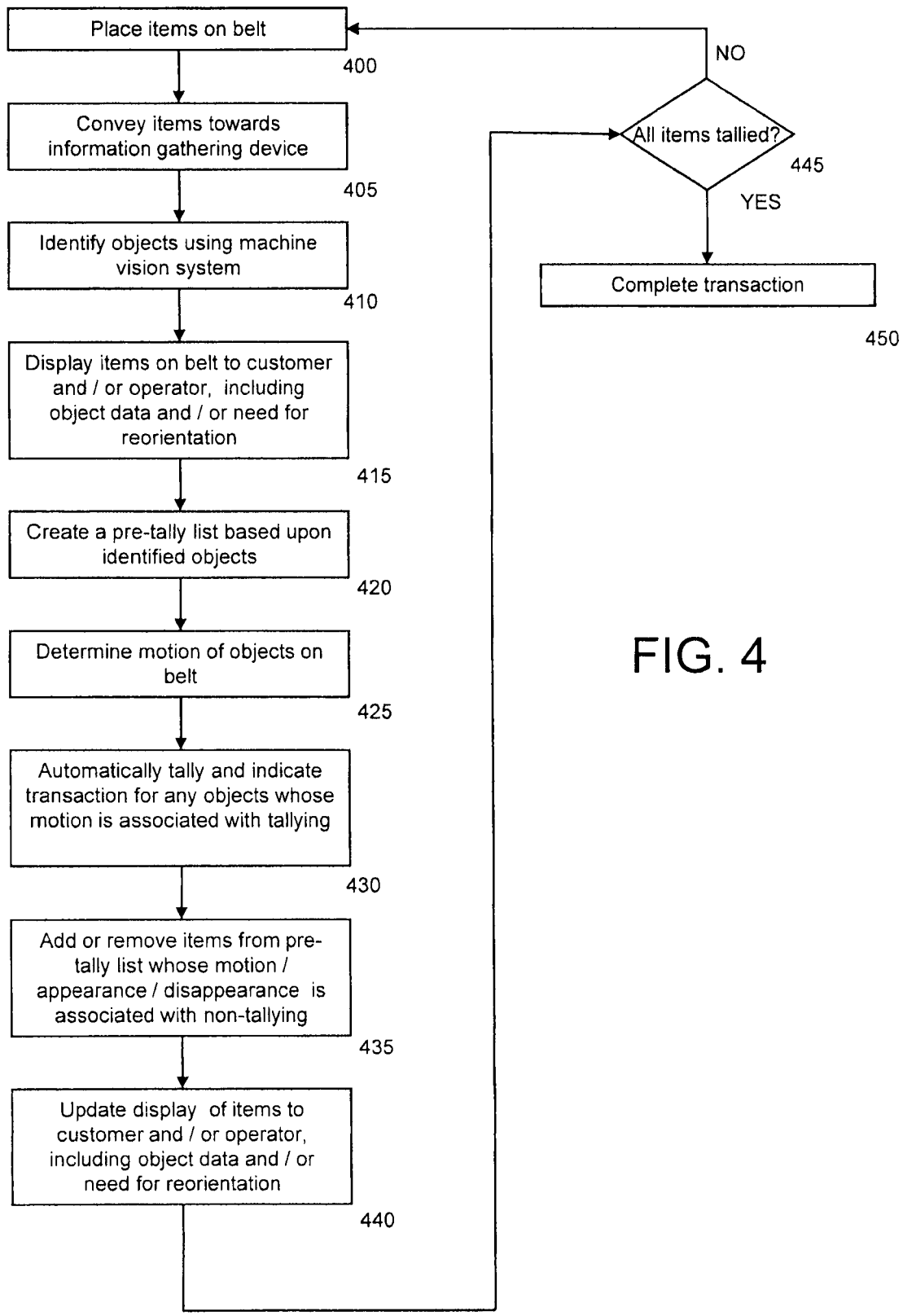
FIG. 4 is a flow chart for a method of operating a data reading system according to a preferred embodiment.

Referring to FIGS. 1 and 4, a method for using the data reading system 100 is illustrated. A customer places objects 40 on belt 25 at step 400. Belt 25 is activated and conveys the objects 40 towards the information gathering device 35 at step 405. The belt 25 stops running when the objects 40 approach the information gathering device 35, for example by a light beam sensor or the mass of the objects 40 triggering a weight sensor underneath the belt 25 and proximate the information gathering device 35.

As the objects 40 are conveyed towards the information gathering device 35, some of the objects 40 may enter the field of view 30 for the machine vision system 5. The machine vision system 5 includes software, or is operatively connected to a computer hosting software, for example, computer 10, that enables the machine vision system 5 to identify, or recognize, the individual objects 40a-40c at step 410. Preferably, images of the objects 40a-40c are captured when the belt 25 stops moving. When the objects 40a-40c are still, or substantially still, an imaging device or camera (such as a CMOS imager with a rolling shutter) may more easily capture images that are sufficiently sharp to permit image processing, for example, identifying and decoding optical codes. An image may be considered to be sharp and have sufficient contrast with the background when a signal contrast transfer function or other suitable function such as an optical transfer function is performed and the signal modulation is 15% or greater. Signal modulation may be calculated by subtracting the minimum signal (representing the darkest pixel) from the maximum signal (representing the brightest pixel) and dividing the result by the sum of the maximum and minimum signals. The percentage of signal difference that represents sufficient sharpness and contrast for optical code decoding may vary from imager to imager.

In one embodiment, the machine vision system 5 is programmed to recognize optical codes associated with each object 40a-40d, such as a UPC, and to look up information related to each optical code in the POS as part of the identification process. In other embodiments, the machine vision system 5 is programmed to recognize features and characteristics of objects 40 without or in conjunction with optical code decoding. For example, the scale invariant feature transformation method, rotation invariant transformation method, speeded up robust features method, or other suitable programming method, may be used for object recognition.

The machine vision system 5 may locate an optical code on the surface of the object 40a that faces the machine system 5. After locating the optical code, the machine vision system 5 decodes the information contained in the optical code and uses the decoded information to perform a lookup in the POS. The POS retrieves information associated with the optical code, and thus with the object 40a, thereby completing the recognition of the object 40a. In a similar manner, the object 40b may be identified. The machine vision system 5 also preferably determines a position for each object 40 in the field of view 30, and associates each object's decoded information with each object's position, for example, in a database.

It is recognized that not all of the objects 40 may be identified at step 410. An object 40d may be outside the field of view 30, or the optical code on object 40c may not face the machine vision system 5, even if the machine vision system 5 includes multiple imagers, such as imagers 306 and 307, provided at various angles and positions. If object 40c is not recognized at step 410, the data reading system 100 may prompt a customer to re-orient the object 40c at step 415. For example, the customer display 15/45 may include a light source 15 that shines lights of two colors onto the objects 40. Green lights 16a and 16b illuminating the objects 40a and 40b indicate that the data reading system 100 recognizes those objects. However, a red light 16c illuminating the object 40c indicates that the data reading system 100 does not recognize that object.

The customer display 15/45 may include a speaker 44 (providing an audible tone or message) or a display screen 45 (providing an visual message) to instruct a customer to re-position or re-orient any objects 40 illuminated by a red light so that an optical code is facing the machine vision system 5. Alternately, printed instructions on a plaque 50 facing the customer or other suitable surface or location may inform the customer of the meaning of the colored lights. As described below, the customer display 15/45 may include only a display screen 45 which shows a representation of the objects 40 and provides information regarding whether an individual object 40a-40c needs to be re-oriented. For example, the display screen 45 may show an image of the objects in the field of view 30 with annotations on the objects in the displayed image indicating which objects may or may not be recognized. A recognized object on the displayed image may be surrounded by a green rectangle and may include additional information, such as item description, price, offers, etc. Unrecognized objects may be surrounded by a red rectangle with an adjacent message to reorient the object.

At step 420, the data reading system 100 creates a pre-tally list that includes all of the recognized objects 40. The pre-tally list may include a description of each object 40a-40c, the price of each object 40a-40c, the cumulative price of the objects 40, or other suitable information. The pre-tally list may be orally communicated, printed on the display screen 45, printed on a slip of paper, or otherwise suitably communicated to the customer. At step 420, the data reading system 100 also indicates on the cashier display 20 which objects 40 are recognized. Alternatively, the light source 15 and/or a light source similar to the light source 15 may illuminate recognized objects 40 for the cashier.

At step 425 the objects 40 are moved, or one of the objects 40a-40c may be moved and the machine vision system 5 identifies motion characteristics for the objects 40. For example, a cashier may grab object 40a and move it towards the information gathering device 35. The machine vision system 5 is preferably programmed to identify motion of an individual item towards the information gathering device as a tallying event, and cause the data reading system 100 to automatically tally the object 40a at step 430. For example, detection of motion of an object 40 adjacent to the edge of the field of view 30 proximate the information gathering device 35 may be used to determine when an object 40 is moved out of the field of view 30 towards the information gathering device 35. An audible tone, or information displayed on the cashier display 20, or other suitable indicator, informs the cashier that the object 40a has been tallied. Thus, the cashier knows that the information gathering device 35 does not need to be used to tally the object 40a.

At substantially the same time the object 40a is moved, the belt 25 activates because of the presence of an unbroken light beam or the missing weight of the object 40a and moves objects 40b-40d towards the information gathering device. The machine vision system 5 is preferably programmed to identify motion characteristics of multiple objects 40. For example, if the objects 40b and 40c move towards the information gathering device 35 together, the machine vision system 35 may identify the motion characteristic as resulting from the belt 25 and cause the data reading system 100 to take no action. Alternately, the machine vision system 5 may interface with the drive mechanism for the belt 25, and may thus obtain information indicating to take no action regarding the motion of the objects 40 when the belt 25 activates. In another alternative, the machine vision system 5 may track the objects 40 and tally the object 40a when it is removed from the field of view 30, and take no actions regarding the objects 40b and 40c because they remain in the field of view, even after the belt 25 moves them towards the information gathering device 35. A combination of identifying motion characteristics and of object tracking may be used in alternate embodiments to determine whether a tallying event occurs when objects 40 move.

At step 435, the customer removes the object 40c from the field of view 30. When the customer removes the object 40c from the field of view, the object 40c is typically not moved towards the information gathering device 35, but typically away from, or substantially parallel to, the information gathering device 35. The machine vision system 5 is preferably programmed to identify motion of an individual item away from, or substantially parallel to, the information gathering device 35 as an event indicating no tallying for the item. For example, there may be a non-tallying response for objects crossing each of the three edges of the field of view 30 corresponding to the three edges that are (1) farthest from the information gathering device 35, (2) closest to the cashier, and (3) closest to the customer. When the machine vision system 5 detects an object 40 moving from the field of view 30 through any of the edges, other than the edge of the field of view 30 proximate the information gathering device 35, the movement may be interpreted as a non-tallying event. Preferably, the data reading system 100 removes the object 40c from the pre-tally list in response to the machine vision system 5 identifying a non-tallying event, and the object 40c is not tallied. Movement of an object 40 through any of the 4 edges of the field of view may be programmed to designate a tallying, non-tallying, or other suitable event.

At step 440, the data reading system 100 confirms tallied objects on the pre-tally list. For example, confirmed objects on the pre-tally list may be underlined, highlighted, or otherwise suitably marked to inform a customer that the confirmed objects have been tallied. Showing a customer which objects have been tallied and which objects are recognized, but not tallied, combined with the customer's ability to remove recognized objects and to add objects to be recognized without causing the removed or added objects to be tallied, may permit the customer to modify purchasing decisions to fit a budget, or other suitable purpose.

At step 445 the machine vision system 5 determines whether there are additional objects 40 that have been introduced into the field of view 30 and need to be recognized. For example, once objects 40a-40c have been removed from the belt 25, the belt 25 conveys object 40d into the field of view 30. If there are additional objects to be recognized, recognition resumes at step 410. If not, tallying is completed at step 450 in response to the machine vision system 5 identifying motion characteristics for the recognized objects 40 at step 425 and either tallying or removing objects from the pre-tally list at steps 430 and 435, respectively.

Figure 6:
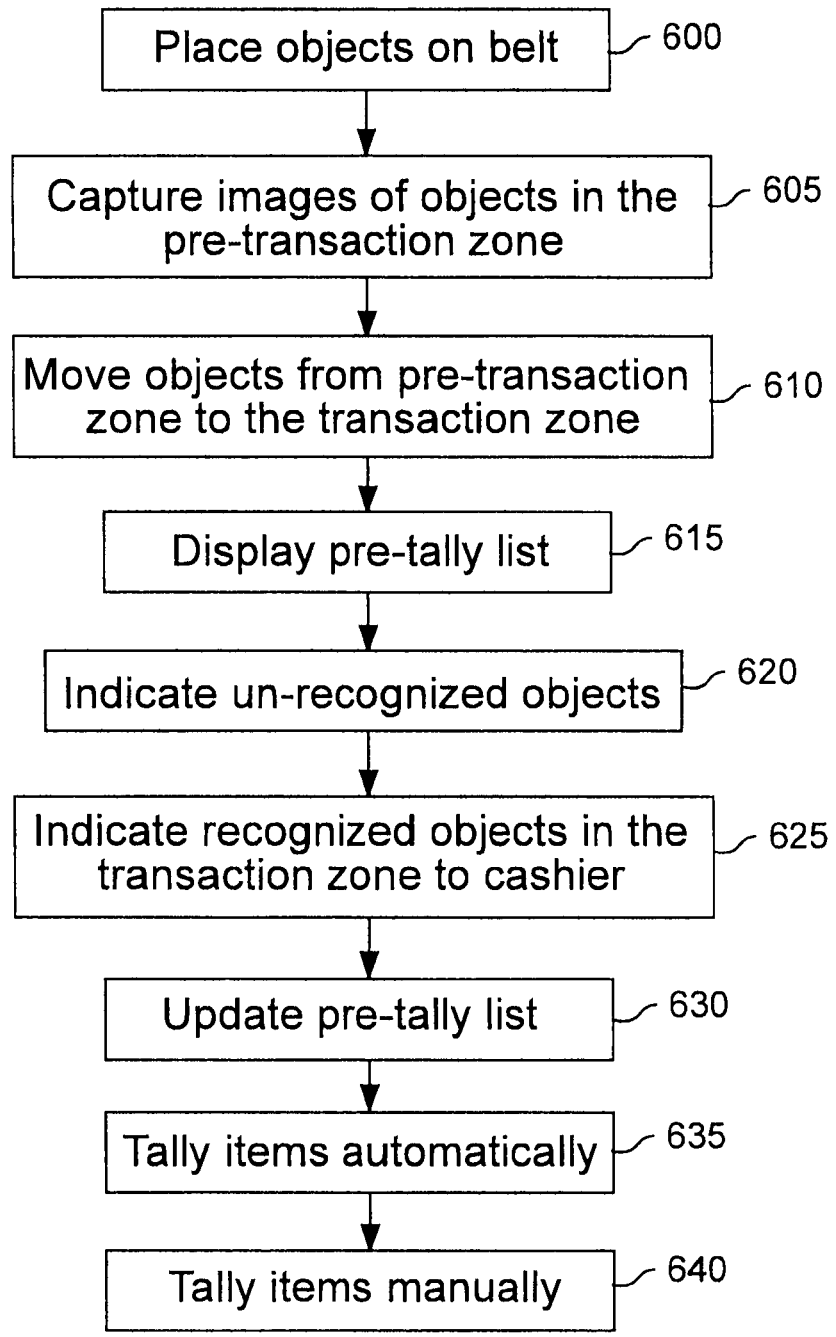
FIG. 6 is a flow chart for another preferred method of operating a data reading system.

With reference to FIGS. 3, 5, and 6, another method for using a data reading system, such as the data reading systems 200 or 300, is illustrated. The data reading system 300 includes a pre-transaction zone 332 defined by a first field of view 330 and includes a transaction zone 334 defined by a second field of view 331. A customer places items to be purchased on belt 325 at step 600. Belt 325 is preferably stationary when objects 340 are initially placed on the belt 325.

The machine vision system 305 captures images of the objects 340 that appear in the first field of view 330 at step 605. The images of the objects 340 are processed, that is, recognized and tracked, as described above, and a pre-tally list is generated and displayed to the customer, for example, on the customer display 345 at step 610. At step 615, a customer display 345 indicates any objects 340 that are not recognized at step 610, and preferably prompts the customer to re-orient any unrecognized objects 340 so they may be recognized. For example, an unrecognized object, such as 340f (FIG. 5) may be highlighted on the customer display 345 with a message such as "Please place bar code face up." If a customer re-orients the object 340f before the object 340f is moved, the machine vision system 5 may recognize the object 340f and add it to the pre-tally list. Alternately, the object 340f may be re-oriented in the transaction zone 334, and the machine vision system 305 may recognize the object 340f for the first time in the transaction zone 334.

The objects 340 are conveyed from the pre-transaction zone 332 to the transaction zone 334, for example, by the cashier activating the belt 325 at step 620. The machine vision system 305 tracks the objects 340, for example, using one of the techniques described above, as they move from the pre-transaction zone 332 to the transaction zone 334.

At step 625, the data reading system 300 indicates which objects in the transaction zone 334 are recognized on the cashier display 320. For example, the cashier display 320 may include a display screen showing images of the objects 340b-340d (FIG. 5). Highlighting, an illuminated border, or other indicator may be used to illustrate which objects are recognized. By informing the cashier which objects are recognized, the cashier knows that the recognized objects may be moved from the transaction zone 334 directly to a bag, or bagging area, and that no action other than removing the recognized objects from the transaction zone 334 is required to tally the recognized objects.

At step 630, the data reading system 300 deletes any recognized objects 340 from the pre-tally list that are removed from the pre-transaction zone 332 to a location other than the transaction zone 334. Recognized objects that appear in the transaction zone 334 remain on the pre-tally list. When recognized objects appearing in the transaction zone 334 are removed from the transaction zone 334, they are automatically tallied at step 635. For example, recognized objects removed from the transaction zone 334 are treated as if scanned and rung up using the information gathering device 335 and POS, but without using the information gathering device 335.

At step 640, the cashier uses the information gathering device 335 in a typical manner to tally any unrecognized objects in the transaction zone 334. Steps 600 through 640 are repeated until all of the objects selected by a customer have been tallied.

Figure 5B:
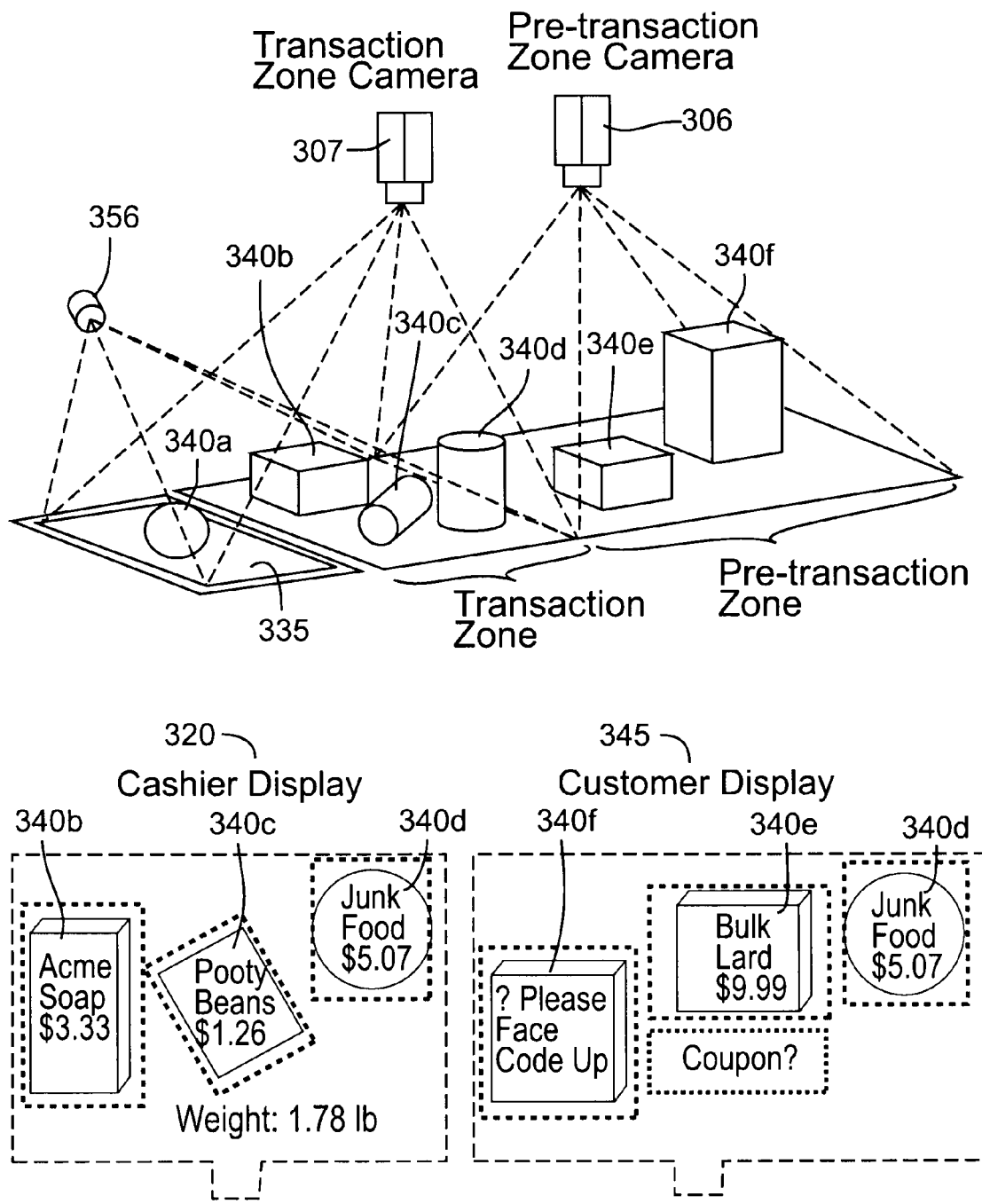
FIG. 5B is another schematic diagram of objects in a pre-transaction zone and of objects in a transaction zone.
Figure 6B:
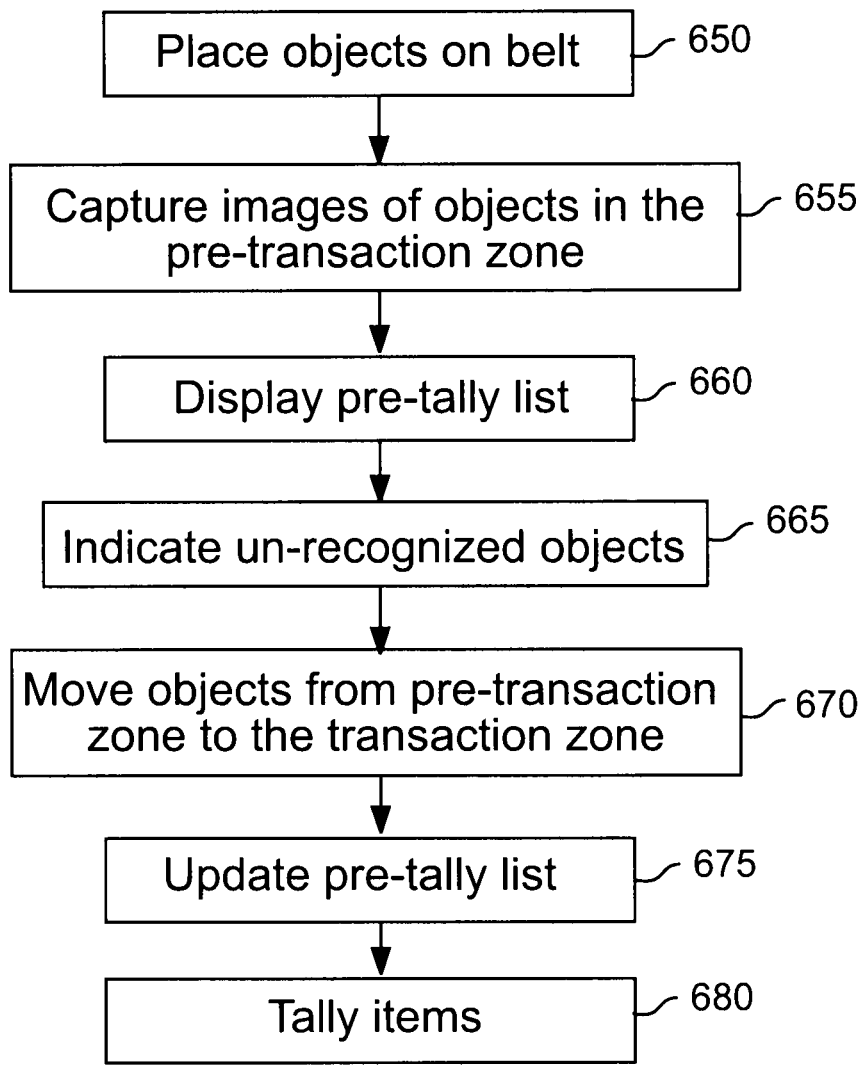
FIG. 6B flow chart for another method of operating a data reading system according to a preferred embodiment.

With reference to FIGS. 3B, 5B, and 6B, another method for using a data reading system, such as the data reading system 360, is illustrated. The data reading system 360 preferably includes a pre-transaction zone 332 defined by a first field of view 330 and a transaction zone 336 defined by a second field of view 337. Transaction zone 336 preferably includes information gathering device 335 as well as a portion of belt 325. Alternately, one or more fields of view may define one or more zones in which items are placed. A customer places items to be purchased on belt 325 at step 650. Belt 325 is preferably stationary when objects 340 are initially placed on the belt 325.

The machine vision system 305 captures images of the objects 340 that appear in the first field of view 330 at step 655. For example, the images of the objects 340 are processed, that is, recognized and tracked as described above. A pre-tally list is generated and displayed to the customer, for example, on the customer display 345, at step 660. At step 665, a customer display 345 preferably indicates any objects 340 that are not recognized at step 660, and preferably prompts the customer to re-orient any unrecognized objects 340 so they may be recognized. For example, an unrecognized object, such as 340f (FIG. 5B) may be highlighted on the customer display 345 with a message such as "Please face code up." If a customer re-orients the object 340f before the object 340f is moved, the machine vision system 305 may recognize the object 340f and add it to the pre-tally list. Alternately, the object 340f may be re-oriented in the transaction zone 336, and the machine vision system 305 may recognize the object 340f for the first time in the transaction zone 336. Alternately, step 665 may be skipped.

The objects 340 are conveyed from the pre-transaction zone 332 to the transaction zone 336 at step 670, for example, by the cashier activating the belt 325. The machine vision system 305 tracks the objects 340, for example, using one of the techniques described above, as they move from the pre-transaction zone 332 to the transaction zone 336.

At step 675, the data reading system 360 deletes any recognized objects 340 from the pre-tally list that are removed from the pre-transaction zone 332 to a location other than the transaction zone 336. Recognized objects that appear in the transaction zone 336 remain on the pre-tally list. Alternately, recognized objects that appear in the transaction zone 336 and are moved away from the information gathering device 335 may be removed from the pre-tally list and are preferably not tallied.

When recognized objects appearing in the transaction zone 336 are removed from the belt 325 and moved over or near information gathering device 335, such objects are automatically tallied at step 680. Preferably, an audible beep from the information gathering device 335 informs a checkout clerk that such an object has been tallied. For example, machine vision system 305 tracks such objects 340 as they are moved near information gathering device 335. Recognized objects moved near or over the information gathering device 335 are treated as if scanned and rung up using the information gathering device 335 and POS, but without using the information gathering device 335. Preferably, conventional double-read prevention techniques may be employed in the event information gathering device 335 gathers information from such a recognized object 340 as such object 340 passes over information gathering device 335. Alternately, any information gathered by the information gathering device 335 may be ignored by the POS for such objects 340 recognized by the machine vision system 305.

Preferably, when machine vision system 305 includes multiple imagers, such as imagers 306, 307, 354, and 356, most of an object is viewed by machine vision system 305 except for the side of an object resting on belt 325. Thus, the likelihood of machine vision system 305 recognizing an object is increased. And, an unrecognized object has a relatively high likelihood of having a bar code or other suitable source of information located on the side resting on the belt 325. Therefore, when a checkout clerk passes an unrecognized object over the information gathering device 335, the information gathering device 335 has a relatively high likelihood of gathering information from such an unrecognized object.

It is expected that the machine vision system 305 will recognize and track a large majority of items. The customer or operator may thus presume that an item has been identified and may rapidly move items from the belt, through the scan zone and to a bagging area. Speed is preferably enhanced because the "beep" is sounded as soon as a recognized item enters the scan region. Thus, recognized items can be moved though the scan region very quickly (preferably more quickly than normal) without requiring any re-orientation of the barcode while the machine vision system 305 tracks the item's movement. As far as the customer or operator knows, the item was read by the information gathering device 335. Conventional double-read prevention techniques may be employed in the event the scanner is reading the bar code on recognized items, or the scanner read can be ignored for recognized items.

At step 680, when an unrecognized object 340 is removed from the belt 325 and moved over or near the information gathering device 335, for example, through a scan volume, in conventional barcode reading fashion, the information gathering device 335 preferably gathers information from the unrecognized object and provides an audible beep to inform the checkout clerk that such object has been tallied.

Therefore, at step 680 recognized objects 340 are preferably tallied as soon as the machine vision system 305 determines that such objects approach the information gathering device 335. Unrecognized objects 340 are preferably tallied by the information gathering device 335 and the POS as such objects are moved near or over the information gathering device 335. Thus, at step 680 a cashier display 320 may indicate which objects 340 are recognized by machine vision system 305. However, a checkout clerk preferably does not need to know which objects 340 are recognized by machine vision system 305 because the same motion of passing an object over or near information gathering device 335 preferably results in tallying both recognized and unrecognized objects 340, which may increase checkout efficiency and speed. Therefore, cashier display 320 preferably does not indicate which objects 340 are recognized by machine vision system 305.

If a checkout clerk moves an object 340 over the information gathering device 335 and does not hear a beep, the checkout clerk knows to re-present such an object to the information gathering device 335. The present inventors have recognized that certain embodiments may permit a checkout clerk to use such embodiments without requiring new or additional training.

Alternately, at step 680 a checkout clerk may grab two objects 340 at the same time and move both of the objects over or near the information gathering device 335. If both objects 340 are recognized by machine vision system 305, information gathering device 335 preferably provides two beeps in rapid succession when such objects are moved over or near the information gathering device 335. Thus, a checkout clerk knows both such objects were tallied.

The data reading system 360 may operate in alternate manners if one object 340 is recognized and one object 340 is unrecognized. For example, data reading system 360 may cause the information gathering device 335 to only beep once when both a recognized and an unrecognized object are moved near or over the information gathering device 335. Upon hearing only one beep, a checkout clerk may consult a display associated with the POS to determine which object is the unrecognized object that needs to be re-presented to the information gathering device 335.

Alternately, the information gathering device 335 may be able to gather information from the unrecognized object when both the recognized and the unrecognized objects are moved over or near the information gathering device 335. The data reading system 360 may then cause the information gathering device 335 to beep twice in rapid succession, thus letting the checkout clerk know that both objects were tallied.

Alternately, the data reading system 360 may prevent the information gathering device 335 from beeping at all when both a recognized and an unrecognized object 340 are moved over or near the information gathering device 335. A checkout clerk may then present each such object singularly to the information gathering device 335. Because machine vision system 305 preferably continues to track each such object 340, when the recognized object 340 approaches, or is in, the scan region of the information gathering device 335, a beep is sounded to inform the checkout clerk that such object has been tallied, preferably without actually using information gathering device 335. When such an unrecognized object is presented to the information gathering device 335, a beep is provided once the information gathering device 335 is able to gather information from such unrecognized object 340.

In another alternate, the data reading system 360 prevents the information gathering device 335 from providing any beeps when both a recognized and an unrecognized object 340 are moved near or over the information gathering device 335. The data reading system 360 may then ignore that the machine vision system 305 recognizes one of the objects 340 and switch to a conventional information gathering mode using the information gathering device 335. Likewise, when two unrecognized objects 340 are moved near or over the information gathering device 335, the data reading system 360 preferably employs a conventional information gathering mode using the information gathering device 335. When in a conventional information gathering mode, the data reading system 360 preferably prompts the customer or operator to manually scan the objects, one at a time, using the information gathering device 335.

Steps 650 through 680 are repeated until all of the objects selected by a customer have been tallied.

At a typical checkout, there are multiple customers bringing groups of their items consecutively onto the belt 325. FIG. 7 illustrates separation between items of consecutive customers. A bar 705, or other suitable marker, placed on the belt 325 may indicate a separation between items 700 selected for purchase by 2 separate customers. The data reading system 300 is preferably programmed to recognize objects 700 between the bar 705 and the information gathering device 335 as a separate transaction from objects 700 on the opposite side of the bar 705. Objects 700 on the opposite side of the bar 705 may be recognized and tracked as described above. When the transaction for objects 700 between the bar 705 and the information gathering device 335 is completed, the recognized objects 700 from the opposite side of the bar 705 may be used to automatically create and display on the customer display 345 (FIG. 3) a pre-tally list. Processing for the objects 700 from the opposite side of the bar 705 preferably continues from step 610.

Alternate embodiments may be used with a self-checkout station. Instead of including two displays 45 and 20 (FIG. 2) only the display 45 may be needed for use with a self-checkout station, and the customer essentially performs the roles of both the customer and the cashier using the display 45. In a self-checkout embodiment, the scanner 235 is preferably positioned where the customer may easily use the scanner 235 if needed.

An alternate to including a cashier display 20 or 320, is to include an augmented reality system. Augmented reality systems overlay virtual data or images on real-world objects when real-world objects are viewed on or through a screen or display. For example, the CyberCode system developed by Jun Rekimoto and Yuji Ayatsuka at Sony Computer Science Laboratories, Inc., Tokyo, Japan, uses optical codes on objects to assist a machine vision system to identify the object and to determine the real world Cartesian coordinates of the object with respect to the camera that is imaging the optical code. See the paper "CyberCode: Designing Augmented Reality Environments with Visual Tags" at http://ftp.csl.sony.co.jp/person/rekimoto/papers/dare2000.pdf (visited on Dec. 11, 2008), which is hereby fully incorporated by reference.

A cashier wearing a video imaging head mounted display, or a see-through head mounted display, including one or more cameras operatively connected to a computer, such as the computer 10, 310, or machine vision system 5, 305, may view information regarding products on a belt 25, 325 while looking at the belt 25, 325. Head mounted displays are commercially available, for example, the Visette45 from Cybermind Interactive Nederland of Maastricht, The Netherlands, models 005-502-202 and 005-502-203 (see through) and 005-502-002 and 005-502-003 (video). The head mounted display may decode optical codes, which may be the same optical codes decoded by the machine vision system 5, 305, or may be additional optical codes, affixed to the objects on the belt 25, 325 to identify the products and to determine the location of the products with respect to the head mounted display. Information from the machine vision system 5, 305 regarding which objects are recognized by the data reading system 100, 300 can then be overlaid on the objects in the cashier's field of view through and/or in the head mounted display. Thus, the cashier may look directly at the belt 25, 325 and be presented with information regarding which objects are recognized by the data reading systems 100, 200, 300, or 360.

Alternately, a see-through screen or window may be interposed between the cashier and the belt 25, 325, and a head tracking system may be used in conjunction with an augmented reality system to display information about products on the belt 25, 325 so that relevant information for each product overlies each product from the cashier's viewpoint. One example of a suitable head tracking system is the HiBall-3100 from 3rd Tech of Durham, N.C., United States. A head tracking system may alternately be used with a head mounted display to provide spatial relationship information with respect to a cashier's head and objects on the belt 325 to the data reading system 300. A head tracking system may thus eliminate the need for the head mounted display to determine the location of the objects.

Alternately, a customer display, such as customer display 15, 45, 345, may include an augmented reality system such as those described above. For example, a customer may be provided with a wearable head mounted display or a see-through screen or window may be provided between a customer and a belt 25, 325 and such wearable display or see-through display may be used in conjunction with a head tracking system.

It will be obvious to those having skill in the art that many changes may be made to the details of the above-described embodiments without departing from the underlying principles of the invention.

The invention claimed is:

1. A data reading system comprising:
a machine vision system including (a) a first field of view defining a pre-transaction zone, (b) a second field of view located adjacent and downstream of the first field of view, the second field of view defining a transaction zone, and (c) an information gathering device for identifying items presented thereto;

a computer system operatively connected to the machine vision system for receiving images from the machine vision system, wherein the computer system is programmed to
(a) recognize objects appearing in the first field of view;
(b) collect information about recognized objects in the first field of view;
(c) track recognized objects when recognized objects are moved from the first field of view and into the second field of view; and
(d) automatically tally recognized objects that were already previously recognized in the first field of view when the recognized objects are removed from the second field of view without requiring the previously recognized objects to be identified by the information gathering device.

2. A data reading system according to claim 1, further comprising a cashier display operatively connected to the computer system, wherein the computer system is further programmed to (e) indicate via the cashier display which objects in the second field of view have been recognized in the first field of view via the machine vision system.

3. A data reading system according to claim 1 further comprising a cashier display operatively connected to the computer system;
wherein the customer display includes a first display screen; and
the cashier display includes a second display screen.

4. A data reading system according to claim 3, wherein:
the second display screen includes an augmented reality display viewable by a cashier.

5. A data reading system according to claim 4, wherein:
the augmented reality display includes a head mounted display worn by a cashier.

6. A data reading system according to claim 4, wherein:
the augmented reality display includes a see-through screen interposed between a cashier and recognized objects.

7. A data reading system according to claim 1, wherein:
the machine vision system includes a first camera and a second camera; and
the first field of view corresponds to the first camera and the second field of view corresponds to the second camera.

8. A data reading system according to claim 7, wherein the first and second cameras include CMOS imagers with rolling reset shutters.

9. A data reading system according to claim 7, wherein the first and second cameras include CMOS imagers with global reset shutters.

10. A data reading system according to claim 1 further comprising
a customer display operatively connected to the computer system, wherein the computer system is further programmed to (e) display a pre-tally representation of recognized objects via the customer display.

11. A data reading system comprising
a machine vision system including (a) a first field of view defining a pre-transaction zone and (b) a second field of view located adjacent and downstream of the first field of view, the second field of view defining a transaction zone;
a computer system operatively connected to the machine vision system for receiving images from the machine vision system; and
a customer display operatively connected to the computer system, wherein the computer system is programmed to (a) recognize objects appearing in the first field of view, (b) display a pre-tally representation of recognized objects via the customer display, (c) collect information about recognized objects in the first field of view, (d) track recognized objects when recognized objects are moved, (e) automatically tally recognized objects when recognized objects are removed from the second field of view, (f) via the customer display, prompt for re-positioning objects that appear in the first field of view, but are not recognized; and (g) remove objects from the pre-tally list when recognized objects are removed from the pre-transaction zone, but do not enter the transaction zone.

12. A data reading system comprising
a machine vision system including (a) a first field of view defining a pre-transaction zone and (b) a second field of view located adjacent and downstream of the first field of view, the second field of view defining a transaction zone;
a computer system operatively connected to the machine vision system for receiving images from the machine vision system; and
a customer display operatively connected to the computer system,
wherein the computer system is programmed to (a) recognize objects appearing in the first field of view, (b) display a pre-tally representation of recognized objects via the customer display, (c) collect information about recognized objects in the first field of view, (d) track recognized objects when recognized objects are moved, (e) automatically tally recognized objects when recognized objects are removed from the second field of view,
wherein the customer display includes a plurality of colored annotations for indicating recognized objects in the pre-transaction zone and to prompt for re-positioning unrecognized objects.

13. A data reading system according to claim 12, wherein:
the plurality of colored annotations included in the customer display includes light beams of a first color for indicating recognized objects and light beams of a second color to prompt for re-positioning objects.

14. A data reading system according to claim 13, further comprising lasers to generate the colored light beams.

15. A data reading system according to claim 12, further comprising
a cashier display operatively connected to the computer system, wherein the cashier display includes a plurality of colored annotations for indicating recognized objects in the transaction zone.

16. A data reading system comprising:
a machine vision system including a field of view coincident with a substantially flat surface;
a computer system operatively connected to the machine vision system for receiving images from the machine vision system; and
an optical code reader for identifying objects presented thereto;
wherein the computer system is programmed to (a) recognize an object appearing in the field of view using the images received from the machine vision system; (b) collect information about recognized objects in the field of view; (c) track recognized objects when recognized objects are moved; and (d) automatically tally recognized objects that were already recognized by the computer system using the images received from the machine vision system, without identifying the objects with the optical code reader, when the recognized objects are removed from the field of view.

17. A data reading system according to claim 16, further comprising a customer display operatively connected to the computer system, wherein the computer system is further programmed to (e) display a prompt via the customer display for re-positioning objects that appear in the field of view, but are not recognized.

18. A data reading system according to claim 17, further comprising a cashier display operatively connected to the computer system;
wherein the computer system is further programmed to (f) indicate via the cashier display which objects in the field of view are recognized.

19. A data reading system according to claim 16, wherein the computer system is further programmed to (e) automatically tally recognized objects when recognized objects are removed from the field of view in a first direction.

20. A data reading system according to claim 19, wherein the computer system is further programmed to
(f) display a pre-tally representation of recognized objects via the customer display; and
(g) remove objects from the pre-tally list when objects are removed from the field of view in a second direction.

21. A data reading system according to claim 16, further comprising a cashier display operatively connected to the computer system;
wherein the customer display includes a first display screen; and
the cashier display includes a second display screen.

22. A data reading system according to claim 21, wherein: the second display screen includes an augmented reality display viewable by a cashier.

23. A data reading system according to claim 22, wherein: the augmented reality display includes a head mounted display worn by a cashier.

24. A data reading system according to claim 22, wherein: the augmented reality display includes a see-through screen interposed between a cashier and recognized objects.

25. A data reading system according to claim 16, wherein: the machine vision system includes a camera having a CMOS imager with a rolling reset shutter.

26. A data reading system according to claim 16, wherein: the machine vision system includes a camera having a CMOS imager with a global reset shutter.

27. A data reading system comprising
a machine vision system including a field of view coincident with a substantially flat surface;
a computer system operatively connected to the machine vision system for receiving images from the machine vision system; and
a customer display operatively connected to the computer system, wherein the computer system is programmed to (a) recognize objects appearing in the field of view; (b) collect information about recognized objects in the field of view; (c) track recognized objects when recognized objects are moved; and (d) automatically tally recognized objects when recognized objects are removed from the field of view;
a cashier display operatively connected to the computer system;
wherein the customer display includes a plurality of colored annotations for indicating recognized objects in the field of view and to prompt for re-orienting unrecognized objects; and
wherein the cashier display includes a plurality of colored annotations for indicating recognized objects in the field of view.

28. A data reading system according to claim 27, wherein:
the plurality of colored annotations included in the customer display includes light beams of one color for indicating recognized objects and light beams of a second color to prompt for re-positioning unrecognized objects.

29. A method for tallying objects comprising:
recognizing objects appearing in a field of view using a machine vision system;
via a customer display, prompting a customer to re-position objects appearing in the field of view that are not recognized using the machine vision system;
recognizing re-positioned objects appearing in the field of view using the machine vision system;
indicating recognized objects in the field of view via the customer display;
tracking recognized objects in the field of view using the machine vision system when recognized objects are moved through or out of the field of view;
identifying objects not recognized by the machine vision system using an optical code reader; and
automatically tallying recognized objects using a computer system operatively connected to the machine vision system when recognized objects are removed from the field of view without requiring the previously recognized objects to be identified by the optical code reader.

30. A method for tallying objects according to claim 29, further comprising:
displaying via the customer display a pre-tally list of recognized objects.

31. A method for tallying objects according to claim 29, wherein automatically tallying recognized objects occurs when recognized objects are removed from the field of view in a first direction.

32. A method for tallying objects according to claim 31, further comprising:
displaying via the customer display a pre-tally list of recognized objects; and
removing objects from the pre-tally list when objects are removed from the field of view in a second direction.

33. A method for tallying objects according to claim 29, and further comprising:
indicating recognized objects in the second field of view via a cashier display.

34. A method for tallying objects according to claim 33, further comprising:
displaying via the customer display a pre-tally list of recognized objects appearing in the first field of view; and
removing objects from the pre-tally list when objects are removed from the first field of view, but do not appear in the second field of view.

35. A method for tallying objects according to claim 33, further comprising:
recognizing objects that were not recognized in the first field of view that appear in the second field of view using the machine vision system.

36. A method for tallying objects comprising:
moving objects along an item path through a field of view of a machine vision system, the field of view including a first view portion;
via the machine vision system:
recognizing objects in the first view portion, tracking both recognized and non-recognized objects being moved through the first view portion;

passing non-recognized objects through a read zone of an optical code reader, the read zone being located downstream of the first view portion, and upon successfully identifying the non-recognized objects using the optical code reader: (a) signaling successful read and (b) tallying the previously non-recognized objects having been identified by the optical code reader;

passing recognized objects past or through the read zone of the optical code reader and treating recognized objects moved past or through the read zone of the optical code reader as if identified by the optical code reader by (a) signaling successful read and (b) tallying the recognized objects without requiring the previously recognized objects to be identified by the optical code reader.

37. A method according to claim 36 further comprising employing double-read prevention at the optical code reader in the event a recognized object being passed through the read zone is read by the optical code reader.

38. A method according to claim 36 wherein the step of signaling successful read of the recognized object occurs as it leaves the first view portion and is moved toward the read zone of the optical code reader.

39. A data reading system according to claim 38 wherein the machine vision system comprises at least one camera (1) being positioned above the conveyor, (2) having an overhead view of the conveyor, and (3) providing the images to the computer system.

40. A data reading system comprising:
a machine vision system including a field of view;
a conveyor for conveying objects through at least a first view portion of the field of view;
a computer system operatively connected to the machine vision system for receiving images from the machine vision system;
an optical code reader having a read zone positioned on a downstream end of the first view portion, the optical code reader being operative for reading optical codes on objects and thereby identifying objects passed through the read zone,
wherein the computer system is programmed to (a) recognize objects appearing in the first view portion using the images received from the machine vision system; (b) track objects being conveyed through and out of the first view portion; and (c) automatically tally recognized objects that were already recognized by the computer system using the images received from the machine vision system, without requiring the recognized objects to be identified with the optical code reader, when the recognized objects are removed from the first view portion and passed by or into the read zone.

* * * * *